(12) United States Patent
Chang et al.

(10) Patent No.: US 7,751,442 B2
(45) Date of Patent: Jul. 6, 2010

(54) SERIAL ETHERNET DEVICE-TO-DEVICE INTERCONNECTION

(75) Inventors: Luke Chang, Aloha, OR (US); Gershon Bar-on, Mizrah Biniamin (IL); Benzi Ende, Maale Adumin (IL); Simcha Pearl, Mizrah Biniamin (IL); Sorana Lazarovici, Jerusalem (IL); Noam Avni, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 1107 days.

(21) Appl. No.: 10/741,314

(22) Filed: Dec. 19, 2003

(65) Prior Publication Data

US 2005/0135421 A1 Jun. 23, 2005

(51) Int. Cl.
*H04J 3/24* (2006.01)
(52) U.S. Cl. ...................... 370/474; 370/389
(58) Field of Classification Search .............. 370/230, 370/235, 276, 282, 284, 389, 419, 423, 424
See application file for complete search history.

(56) References Cited

U.S. PATENT DOCUMENTS

| | | | | |
|---|---|---|---|---|
| 4,878,219 A | * | 10/1989 | Kaufman et al. | 370/452 |
| 5,726,976 A | * | 3/1998 | Thompson et al. | 370/229 |
| 6,882,622 B1 | * | 4/2005 | Donoghue | 370/229 |
| 6,907,048 B1 | * | 6/2005 | Treadaway et al. | 370/474 |
| 7,187,709 B1 | * | 3/2007 | Menon et al. | 375/219 |
| 2002/0110144 A1 | | 8/2002 | Gibson et al. | |
| 2002/0190751 A1 | | 12/2002 | Lee et al. | |
| 2002/0191640 A1 | * | 12/2002 | Haymes et al. | 370/466 |
| 2003/0016758 A1 | | 1/2003 | Wu et al. | |
| 2003/0095564 A1 | | 5/2003 | Feuerstraeter et al. | |
| 2003/0217215 A1 | | 11/2003 | Taborek, Sr. et al. | |
| 2003/0235203 A1 | * | 12/2003 | Alderrou et al. | 370/445 |
| 2004/0030805 A1 | * | 2/2004 | Fujimori et al. | 709/250 |
| 2004/0030968 A1 | * | 2/2004 | Fan et al. | 714/704 |
| 2006/0153238 A1 | | 7/2006 | Bar-On | |

FOREIGN PATENT DOCUMENTS

| | | |
|---|---|---|
| EP | 1176753 A2 | 1/2002 |
| WO | 2005067221 A1 | 7/2005 |

OTHER PUBLICATIONS

*International Search Report*, Dated Mar. 23, 2005, PCT/US2004/041105, 6 Pages.
*Written Opinion Of The International Searching Authority*, Dated Mar. 23, 2005, PCT/US2004/041105, 5 Pages.
Serial-GMII Specification, Rev. 1.7, Jul. 19, 2001, Cisco Systems.
IEEE Std. 802.3—2000, Clause 28.

(Continued)

*Primary Examiner*—Ricky Ngo
*Assistant Examiner*—Wei-Po Kao
(74) *Attorney, Agent, or Firm*—Grossman, Tucker, Perreault & Pfleger, PLLC

(57) ABSTRACT

Described are a device and system to transmit 8B/10B code groups including Ethernet data frames in a device-to-device interconnection. Control messages may be interleaved among the 8B/10B code groups for transmission to a destination device.

52 Claims, 1 Drawing Sheet

OTHER PUBLICATIONS

IEEE Std. 802.3—2000, Clause 36.

IEEE P802.3ae/D3.1, Jun. 15, 2001, Clause 47.

International Preliminary Report on Patentability for PCT Patent Application No. PCT/US2004/041105, mailed on Jun. 29, 2006, 7 Pages.

Notice of Allowance Received for TW Patent Application No. 93138127, mailed on Jun. 6, 2006, 4 Pages.

Office Action Received for Taiwan Application No. 93138127, mailed on Nov. 23, 2005, 4 Pages with English Language interpretation.

Office Action Received for Chinese Application No. 200480037042.7, dated May 9, 2008, 32 pages including English language translation.

Office Action received for Chinese Patent Application No. 200480037042.7, mailed on Oct. 16, 2009, 4 pages of Office Action and English translation of 5 pages.

Office Action received for German Patent Application No. 11 2004 002 503.6-31, mailed on Feb. 2, 2010, 6 pages of Office Action and English translation of 6 pages.

* cited by examiner

SERIAL ETHERNET DEVICE-TO-DEVICE INTERCONNECTION

This application relates to U.S. patent application Ser. No. 10/291,017, filed on Nov. 7, 2002.

BACKGROUND

1. Field

The subject matter disclosed herein relates to interfaces between devices. In particular, the subject matter disclosed herein relates to devices capable of transmitting or receiving data in device-to-device interconnections.

2. Information

Semiconductor devices in a printed circuit board (PCB) typically communicate through a device-to-device interconnection (DDI). Such a DDI typically includes copper traces formed in the PCB to transmit signals between devices. A device may be coupled to a DDI by solder bonding or a device socket secured to the PCB.

Cisco Systems has promoted a Serial Gigabit Media Independent Interface (SGMII) format for transmitting Ethernet data frames between devices over a DDI according to a differential pair signal format. In particular, SGMII specifies the transmission of Ethernet data frames as 8B/10B code groups. Control information may be transmitted in an out-of-band control channel coupled between the devices.

IEEE Std. 802.3ae-2002, Clause 47 defines a 10 Gigabit Attachment Unit Interface (XAUI) for transmitting data between devices in data lanes. Each data lane typically transmits a serial data signal between the devices using a differential signaling pair. A XAUI is typically coupled to a 10 Gigabit Media Independent Interface (XGMII) which is capable of transmitting or receiving data at a data rate of ten gigabits per second. In addition, the XAUI format may be used in transmitting data over an Infiniband 4× cable as described in the proposed 10GBASE-CX4 standard presently being explored by the IEEE P802.3ak working group.

BRIEF DESCRIPTION OF THE FIGURES

Non-limiting and non-exhaustive embodiments of the present invention will be described with reference to the following FIGURE, wherein like reference numerals refer to like parts throughout unless otherwise specified.

DETAILED DESCRIPTION

Figure 1:
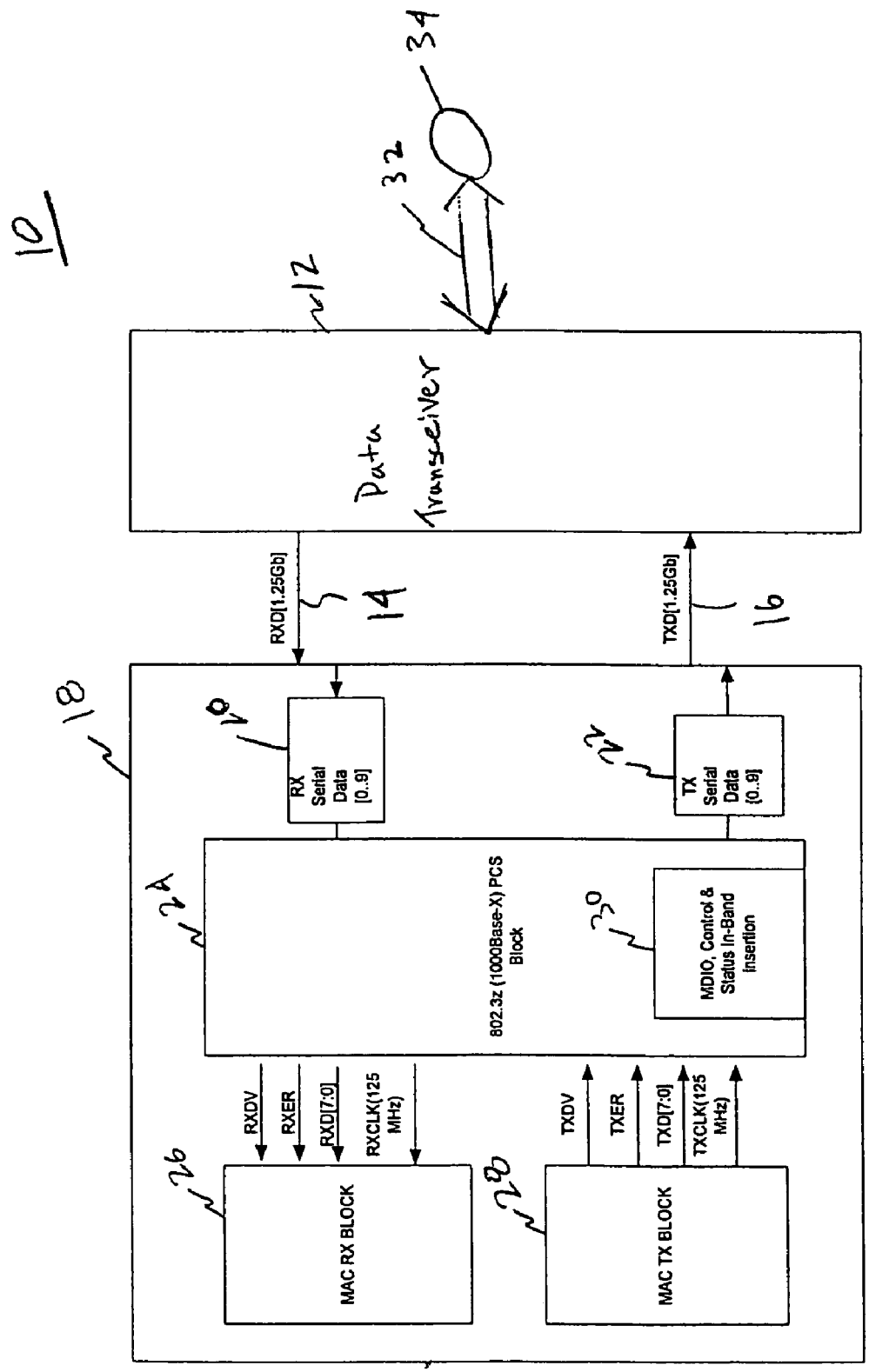
FIG. 1 shows a schematic diagram of devices coupled by a device-to-device interconnection (DDI) according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

A "device-to-device interconnection" (DDI) as referred to herein relates to a data link to transmit data between devices. For example, a DDI may be formed by conductive traces formed on a circuit board between device sockets to receive devices. A DDI may traverse multiple devices coupled between two devices over a backplane and comprise conductive traces coupling the devices to one another. In another example, a DDI may comprise a cable coupled between two connectors at opposite ends of the cable. Each connector may then transmit data between the cable and a device coupled to the connector by conductive traces. However, these are merely examples of a DDI and embodiments of the present invention are not limited in these respects.

A "serial data signal" as referred to herein relates to a signal comprising information encoded into a series of symbols. For example, a serial data signal may comprise a series of symbols transmitted in a transmission medium where each symbol is transmitted in a symbol period. However, this is merely an example of a serial data signal and embodiments of the present invention are not limited in these respects.

A "differential pair signal" as referred to herein relates to a pair of synchronized signals to transmit encoded data to a destination. For example, differential pair signal may transmit a serial data signal comprising symbols to be decoded for data recovery at a destination. Such a differential pair signal may transmit each symbol as a voltage on each of two transmission media. However, these are merely examples of a differential pair signal and embodiments of the present invention are not limited in these respects.

An "8B/10B encoding scheme" as referred to herein relates to a process by which eight-bit data bytes may be encoded into ten-bit "code groups" (e.g., 8B/10B code groups), or a process by which ten-bit code groups may be decoded to eight-bit data bytes according to a predetermined "8B/10B code group mapping." An "8B/10B encoder" as referred to herein relates to logic to encode an eight-bit data byte to a ten-bit code group, and an "8B/10B decoder" as referred to herein relates to logic to decode an eight-bit byte from a ten-bit code group. An "8B/10B codec" as referred to herein relates to a combination of an 8B/10B encoder and an 8B/10B decoder.

"Transmission medium" as referred to herein relates to a medium capable of transmitting data from a source to a destination. For example, a transmission medium may comprise cabling (e.g., coaxial, unshielded twisted wire pair or fiber optic cabling), printed circuit board traces or a wireless transmission medium. However, these are merely examples of a transmission medium and embodiments of the present invention are not limited in these respects.

An "Ethernet data frame" as referred to herein relates to a format for transmitting data in a data link according to a protocol provided in versions of IEEE Std. 802.3 (e.g., to transmit data frames according to 10BASE-X, 100BASE-X, 1000BASE-X or 10GBASE-X protocols). An Ethernet data frame may include, for example, a header portion including a media access control (MAC) address and a payload portion including content data to be processed at a destination. However, this is merely an example of an Ethernet data frame and embodiments of the present invention are not limited in these respects.

An Ethernet data frame may be used to transmit content data between devices or nodes in a data channel. A "control message" as referred to herein relates to messages that may be transmitted between devices or nodes other than content data to notify a node or device receiving the control message of events, status, requests or configuration commands. However, these are merely examples of a control message and embodiments of the present invention are not limited in these respects. A control message may be transmitted in a communication channel which is distinct from a data channel as an "out-of-band" message. Alternatively, a control message may be inserted or interleaved among content data transmitted in a data channel as an "in-band" message.

Briefly, an embodiment of the present invention relates to the transmission of 8B/10B code groups including Ethernet data frames in a DDI. Control messages may be inserted among the 8B/10B code groups for transmission to a destination device. However, this is merely an example embodiment and other embodiments are not limited these respects.

FIG. 1 shows a schematic diagram of a system 10 for transmitting data to and receiving data from a node 34 through a transmission medium 32. The transmission medium 32 may comprise any one of several mediums suitable for transmitting data in a data link such as, for example, a cable (e.g., coaxial, unshielded twisted wire pair or fiber optic) or a wireless transmission medium. The transmission medium 32 may transmit data between the node 34 and a data transceiver 12 in Ethernet data frames according to versions of IEEE Std. 802.3 (e.g., 10BASE-X, 100BASE-X, 1000BASE-X or 10GBASE-X).

The data transceiver 12 may be coupled to a controller 18 by a DDI. The DDI may transmit a first differential pair signal 14 from the data transceiver 12 to the controller 18 and transmit a second differential pair signal 16 from the controller 18 to the data transceiver 12. According to an embodiment, each of the first and second differential pair signals 14 and 16 may be transmitted in a single pair of conductive traces (e.g., formed in a printed circuit board, not shown) in the DDI coupled between the data transceiver 12 and the controller 18. Accordingly, components containing the data transceiver 12 and the controller 18 may be coupled to one another by four device pins (not shown) on each component (where each component comprises two device pins to transmit or receive differential pair signal 14 and two devices pins to transmit or receive differential pair signal 16). The device pins may be coupled to the DDI by solder bonding or device sockets which are mounted to the DDI and adapted to receive the components containing the data transceiver 12 and controller 18. However, these are merely examples of how device pins may be coupled to a DDI and embodiments of the present invention are not limited in these respects.

The data transceiver 12 may comprise a physical media dependent (PMD) section (not shown) for transmitting data to and receiving data from the transmission medium 32 according to a physical layer data transmission protocol such as Gigabit Ethernet over unshielded twisted wire pair cabling (or 1000BASE-T) or 10 Gigabit Ethernet over unshielded twisted wire pair cabling (or 10 GBASE-T). For example, the PMD section may comprise circuitry to detect individual bits in Ethernet data frames received from the transmission medium 32 (e.g., clock and data recovery circuitry) and circuitry to transmit individual bits in Ethernet data frames transmitted to the node 34. The data transceiver 12 may also comprise circuitry (not shown) to encode eight bit bytes making up Ethernet data frames received from the transmission medium 32 (via the PMD section) into ten bit code groups for transmission to the controller 18 on differential pair signal 14 as a serial data signal. The data transceiver 12 may encode the eight bit bytes into ten bit code groups (e.g., 8B/10B code groups) as described in IEEE 802.3-2002, Clause 36. Similarly, the data transceiver 12 may comprise circuitry to decode 8B/10B code groups received from the differential pair signal 16 into eight bit bytes for transmission in the transmission medium 32 via the PMD section.

The controller 18 may comprise a deserializer 20 to recover 8B/10B code groups from the differential pair signal 14 and a serializer 22 to transmit 8B/10B code groups to the data transceiver 12 as a serial data signal over the differential pair signal 16. A physical coding sublayer (PCS) section 18 may decode the 8B/10B code groups recovered from the deserializer 20 to reconstruct eight-bit bytes of Ethernet data frames received at the data transceiver 12 from node 34. Similarly, the PCS section 18 may encode eight-bit bytes of Ethernet data frames into 8B/10B code groups for the serializer 22 to transmit to the data transceiver 12 in differential pair signal 16 (for transmission to node 34).

The PCS section 24 may be coupled to a media access control (MAC) receive block 26 to provide Ethernet data frames reassembled from eight-bit bytes decoded from 8B/10B code groups. The PCS section 24 may also be coupled a MAC transmit block 28 to receive Ethernet data frames for transmission through the transmission medium 32. The MAC receive block 26 and MAC transmit block 28 may be coupled at a signaling interface providing a Gigabit Media Independent Interface (GMII) as defined in IEEE Std. 802.3-2000, Clause 36. However this is merely an example of how portions of a MAC device may be coupled to a PCS section and embodiments of the present invention are not limited in this respect.

The differential pair signals 14 and 16 may transmit Ethernet data frames as 8B/10B code groups between the data transceiver 12 and controller 18 as provided in IEEE Std. 802.3-2000, Clause 36.2.4. Such code groups used for the transmission of Ethernet data frames may include, for example, ordered code group sets for establishing bit and code group synchronization, data code groups, idle code group (/I/), start of packet delimiter code group (/S/), end of packet delimiter code group (/T/), carrier extend code group (/R/) and error propagation code group (/V/). In addition to transmitting 8B/10B code groups in the differential pair signals 14 and 16 for the transmission of Ethernet data frames, the controller 18 and data transceiver 12 may transmit in-band control messages in the differential pair signals 14 and 16 along with encoded portions of Ethernet data frames. Such in-band control messages may be transmitted as 8B/10B code groups inserted among 8B/10B code groups transmitting encoded eight-bit bytes of Ethernet data frames. By transmitting the control messages in-band as 8B/10B code groups inserted among 8B/10B code groups transmitted over the differential pair signals 14 and 16, control messages which would otherwise be transmitted in a management data input/output (MDIO) interface (either at the data transceiver 12 or controller 18) may be transmitted as the inserted 8B/10B code groups.

According to an embodiment, control messages may be inserted among the 8B/10B code groups in differential pair signals 14 and 16 following an end of packet delimiter /T/ as a six byte (or code group) sequence. When transmitting a control message, for example, the code group sequence:

/T/R/K28.5/Dx.y/(six byte control message)/K28.5/Dx.y/ may be substituted for the typical code group sequence following an Ethernet data frame:

/T/R/K28.5/Dx.y/K28.5/Dx.y/K28.5/Dx.y/K28.5/Dx.y/ K28.5/Dx.y/.

In this example, a six byte idle code group sequence "/K28.5/ Dx.y/K28.5/Dx.y/K28.5/Dx.y/" in the typical code group sequence may be substituted with six bytes forming the control message. A first byte of the six byte control message may include a special symbol to indicate the presence of a control message (e.g., to access MDIO registers at the destination device) such as "/K28.1/" including a comma. A second byte may specify read or write access to specific MDIO registers. Third and fourth bytes may specify information to be written to an MDIO register and a fifth byte may be reserved. Finally, a sixth byte may include a cyclic redundancy code for error correction (excluding the special symbol /K28.1/). Similar six byte packets may be formatted for read access acknowledge/response control messages or write access acknowledge control messages. However, these are merely an example of how a control message may be inserted among 8b/10B code groups for transmitting Ethernet data frames and embodiments of the present invention are not limited in these respects.

According to an embodiment, the PCS section 24 may comprise circuitry 30 to detect 8B/10B code groups carrying in-band control messages from among 8B/10B code groups received from differential pair signal 14, and decode the control messages from the detected 8B/10B code groups according to a predetermined mapping of 8B/10B code groups to control messages. In response to external signals (not shown), the circuitry 30 may encode control messages for transmission to the data transceiver 12 as 8B/10B code groups (e.g., inserted among 8B/10B code groups on differential pair signal 16 containing Ethernet data frames) according to the predetermined mapping of 8B/10 code groups to control messages.

The data transceiver 12 may also comprise circuitry (not shown) to detect 8B/10B code groups carrying in-band control messages from among 8B/10B code groups received from differential pair signal 16, and decode the control messages from the detected 8B/10B code groups according to the predetermined mapping of 8B/10B code groups to control messages. Similarly, the data transceiver 12 may also comprise circuitry to encode control messages for transmission to the data controller 18 as 8B/10B code groups (e.g., inserted among 8B/10B code groups on differential pair signal 14 containing Ethernet data frames) according to the predetermined mapping of 8B/10 code groups to control messages.

According to an embodiment, the data transceiver 12 and controller 18 may support multiple Ethernet protocols at different bit rates including 10BASE-X (at 10 Mbps), 100BASE-X (at 100 Mbps) and 1000BASE-X (at 1000 Mbps). In addition, the data transceiver 12 and controller 18 may support an autonegotiation feature to select a data transmission protocol for use between the data transceiver 12 and the node 34 for transmitting Ethernet data frames in the transmission medium 32 as provided in IEEE Std. 802.3-2000, Clause 28. Accordingly, the data transceiver 12 may be capable of negotiating with the node 34 to select the data transmission protocol having the highest data rate from among common data transmission protocols (e.g., 10BASE-X, 100BASE-X, 1000BASE-X or 10GBASE-X). Following negotiation between the data transceiver 12 and the node 34 to the common data transmission protocol having the highest data rate, the controller 18 may communicate with the node 34 to identify and negotiate additional capabilities (e.g., abilities to transmit in full or half duplex modes) while communicating according to the selected data transmission protocol as provided in IEEE Std. 802.3-2000, Clause 37.

Among control messages that may be transmitted from the data transceiver 12 to the controller 18 in 8B/10B code groups over the differential pair signal 14, the data transceiver 12 may transmit one or more control messages to the controller 18 indicating a data transmission protocol or data rate selected through autonegotiation, or status of the data link between the data transceiver 12 and the node 34 (e.g., active versus inactive, connected versus unconnected, changes in data transmission mode from 10 Gbps to 1 Gbps, etc.). In response to receipt of either of these control messages, the controller 18 my respond by transmitting an acknowledgement in one or more 8B/10B code groups over the differential pair signal 16. However, these are merely examples of control messages that may be transmitted from a data transceiver to a controller in 8B/10B code groups over a differential pair signal and embodiments of the present invention are not limited in these respects.

Using control messages transmitted as 8B/10B code groups in the differential pair signal 14 and in response to data rate selected from autonegotiation with the node 34, the data transceiver 12 and controller 18 may configure the data rate of the differential pair signals 14 and 16 according to the selected data rate. For example, if the data rate selected through autonegotiation is 1000 Mbps (e.g., from a selected 1000BASE-X protocol), the data transceiver 12 and controller 18 may configure the differential pair signals 14 and 16 to transmit at a data rate of 1.25 Gbps. (allowing 250 Mbps of overhead for transmitting 8B/10B code groups encoded from eight-bit bytes of Ethernet data frames). For a selected data rate of 10 or 100 Mbps, the data transceiver 12 and controller 18 may transmit duplicate Ethernet data frames or code groups in differential pair signals 14 and 16 transmitting at 1.25 Gbps. Alternatively, if the data rate selected through autonegotiation is 10 or 100 Mbps (e.g., from a selected 10BASE-X or 100BASE-X protocol), the data transceiver 12 and controller 18 may configure the differential pair signals 14 and 16 at a data rate of 125 Mbps. Transmitting differential pair signals 14 and 16 at the lower data rate of 125 Mbps may enable the data transceiver 12 and controller 18 to operate at lower power (over transmitting at the higher 1.25 Gbps. data rate).

According to an embodiment, the controller 18 may be included as part of a computing platform and coupled to a host processing system (e.g., including a host processor, I/O core logic and system memory) hosting an operating system and/or application programs. As such, the computing platform may define certain states and events such as, for example, a software reset event, power states (e.g., full power, standby, snooze, etc.) and events indicating a transition between power states. Among control messages that may be transmitted from the controller 18 to the data transceiver 12 in 8B/10B code groups over the differential pair signal 16, the controller 18 may transmit control messages indicating a change in the power state of the computing platform (e.g., change from full power to standby or snooze, or from standby or snooze to resume operation full power) enabling the data transceiver to operate at low voltage when the computing platform is not operating at a full power state. However, these are merely examples of control messages that may be transmitted from a controller to a data transceiver in 8B/10B code groups over a differential pair signal and embodiments of the present invention are not limited in these respects.

According to an embodiment, the controller 18 may perform code group and bit synchronization in response to the differential pair signal 14 to ensure the alignment of 8B/10B code groups from the data transceiver 12. Similarly, the data transceiver 12 may also perform code group and bit synchronization in response to the differential pair signal 16 to ensure alignment of 8B/10B code groups from the controller 18. The controller 18 and data transceiver 12 may perform this code group and bit synchronization as provided in IEEE Std. 802.3-2000, Clauses 36.2.4 and 36.2.5.2.6 to ensure synchronization of multi-code group ordered sets to code group boundaries. However, these are merely examples of how code group and bit synchronization may be established and embodiments of the present invention are not limited in these respects.

While transmitting control messages between the controller 18 and data transceiver 12 as in-band 8B/10B code groups and achieving code group and bit synchronization from detection of the received code groups, the controller 18 and data transceiver 12 need only communicate with each other through four device pins (i.e., four device pins on each device to enable transmission of the differential pair signals 14 and 16 between the data transceiver 12 and controller 18). For example, the use of separate pins for an MDIO interface may be avoided by transmitting control messages in-band over the differential pair signals 14 and 16.

The differential pair signals 14 and 16 may be transmitted in a DDI extending thirty inches or more over a circuit board coupling the data transceiver 12 and controller 18 to the DDI. According to an embodiment, the system 10 may be provided on a line card in a switch, router or other platform that may be used for forwarding the contents of an Ethernet data frame from the node 34 and another node. The system 10 may provide a single port among multiple ports coupled by switching circuitry (e.g., switch fabric or Ethernet switch, not shown) to forward data frames from a source port (or ingress port) to a destination port (or egress port). For example, the MAC receive block 26 and MAC transmit block 28 may be coupled to the switching circuitry to forward the contents of frames to, and receive frames from, other ports. Also, the MAC receive block 26 or MAC transmit block 28 may be coupled to network processing devices (e.g., network processor, packet processing ASIC or other device for performing packet classification, protocol processing, intrusion detection, etc.). However, these are merely examples of applications of a line card and embodiments of the present invention are not limited in these respects.

In an alternative embodiment, the system 10 may be provided in a system board or motherboard including a host processor (e.g., microprocessor for hosting an operating system and applications) and an I/O core logic chipset (e.g., system memory controller and peripheral I/O controller, not shown). In this embodiment, the controller 18 may be integrated with one or more portions of an I/O core logic chipset while the data transceiver 12 is located near a physical port connection (e.g., cable connection) separated from the I/O core logic chipset. The controller 18 may be coupled to a multiplex data bus as defined in versions of the Peripheral Components Interconnect (PCI) Local Bus Specification 2.3, PCI-X or PCI-Express (e.g., coupled to a "switch" entity). The system board or motherboard of the presently illustrated embodiment may be combined with a system memory for storing machine-readable instructions of an operating system or application programs to be executed by the host processor. For example, the host processor and system memory may host a device driver that defines buffer locations in the system memory that are used to store data packets received from the controller 18 in data frames or store data packets to be transmitted by the controller as Ethernet data frames. Additionally, the controller 18 may comprise a TCP/IP offload engine (not shown) for performing TCP/IP protocol processing on TCP/IP packets received in Ethernet data frames from the node 34.

Particular embodiments described herein relate to the transmission of 8B/10B code groups (e.g., including Ethernet data frames and control messages) between the data transceiver 12 and controller 18 in single differential pair signals 14 and 18. In other embodiments, however, the 8B/10B code groups may be transmitted between such a data transceiver and controller in multiple differential pair signals. For example, such a data transceiver and controller may be coupled by a DDI comprising a 10 Gigabit Attachment Unit Interface (XAUI) providing four differential pair signals to transmit 8B/10B code groups from the data transceiver to the controller and four differential pair signals to transmit 8B/10B code groups from the controller to the data transceiver. In this embodiment, the data transceiver and controller may each comprise sixteen device pins for coupling to the DDI, eight pins for transmitting 8B/10B code groups and eight pins for receiving 8B/10B code groups. Accordingly, 8B/10B code groups containing control messages may be inserted among 8B/10B code groups (containing Ethernet data frames) transmitted between the controller and data transceiver (in multiple differential pair signals) to obviate the need for an out-of band channel for transmitting the control messages between the data transceiver and the controller.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method for communication using an 8B/10B code, the method comprising:
   receiving Ethernet data frames;
   transmitting 8B/10B code groups in a device-to-device interconnection to a destination device, the transmitted 8B/10B code groups including portions of the received Ethernet data frames; and
   inserting, by an inserting circuit, at least one control message encoded as one or more 8B/10B code groups among the transmitted 8B/10B code groups, wherein the at least one control message is transmitted in-band by inserting the at least one control message between an end of packet delimiter code group and an idle code group sequence and the control message specifies management data input/output (MDIO) register information, thereby allowing for at least one of access to MDIO registers at the destination device, capability to specify read and/or write access to a specific MDIO register at the destination device, and capability to specify information to be written to an MDIO register at the destination device.

2. The method of claim 1, wherein transmitting the 8B/10B code groups in the device-to-device interconnection comprises transmitting the 8B/10B code groups in a first differential pair signal.

3. The method of claim 2, wherein the method further comprises:
   receiving 8B/10B code groups in a second differential pair signal containing the portions of the Ethernet data frames from the destination device; and
   performing at least one of code group synchronization and bit synchronization of the second differential pair signal in response to the 8B/10B code groups received from the destination device.

4. The method of claim 1, wherein receiving the Ethernet data frames further comprises receiving the Ethernet data frames from unshielded twisted wire pair cabling.

5. The method of claim 1, the method further comprising receiving the Ethernet data frames from a transmission medium, wherein the at least one control message comprises a control message indicating at least one of a selected protocol for transmitting data in the transmission medium and a selected data transmission rate for transmitting data in the transmission medium.

6. The method of claim 1, the method further comprising receiving the Ethernet data frames from a transmission medium, wherein the at least one control message further comprises at least one K-character associated with the 8B/10B code.

7. The method of claim 6, the method further comprising:
transmitting the 8B/10B code groups in a differential pair signal over the device-to-device interconnection; and
setting a data rate of the differential pair signal based, at least in part, on the selected data transmission rate.

8. The method of claim 1, the method further comprising receiving the Ethernet data frames from a transmission medium, wherein the at least one control message comprises a control message indicating a status of a data link in the transmission medium.

9. The method of claim 1, wherein the at least one control message comprises a control message indicating one of full duplex and half duplex modes for transmitting data in a transmission medium.

10. The method of claim 1, wherein the at least one control message comprises a control message indicating a change in power state of a computing platform, the change in power state being one of a change from, full power to snooze, or from snooze to full power.

11. The method of claim 1, the method further comprising transmitting the 8B/10B code groups to the destination device in a plurality of differential pair signals.

12. A data transceiver for communication using an 8B/10B code, the data transceiver comprising:
a physical media dependent section to receive Ethernet data frames from a transmission medium; and
circuitry to transmit 8B/10B code groups in a device-to-device interconnection to a destination device, the 8B/10B code groups including portions of the received Ethernet data frames, and to insert at least one control message encoded as one or more 8B/10B code groups among the transmitted 8B/10B code groups, wherein the at least one control message is transmitted in-band by inserting the at least one control message between an end of packet delimiter code group and an idle code group sequence by the circuitry, and the control message specifies management data input/output (MDIO) register information, thereby allowing for at least one of access to MDIO registers at the destination device, capability to specify read and/or write access to a specific MDIO register at the destination device, and capability to specify information to be written to an MDIO register at the destination device.

13. The data transceiver of claim 12, the data transceiver further comprising circuitry to transmit the 8B/10B code groups in a first differential pair signal.

14. The data transceiver of claim 13, the data transceiver further comprising:
circuitry to receive 8B/10B code groups in a second differential pair signal containing portions of Ethernet data frames from the destination device; and
circuitry to perform at least one of code group synchronization and bit synchronization of the second differential pair signal in response to the 8B/10B code groups received from the destination device.

15. The data transceiver of claim 12, wherein the a physical media dependent section comprises circuitry to transmit data to and receive data from unshielded twisted wire pair cabling.

16. The data transceiver, of claim 12, wherein the at least one control message comprises a control message indicating at least one of a selected protocol for transmitting data in the transmission medium, a selected data transmission rate for transmitting data in the transmission medium, and a change in power state of a computing platform, the change in power state being one of a change from full power to snooze, or from snooze to full power.

17. The data transceiver of claim 12, wherein the at least one control message further comprises at least one K-character associated with the 8B/10B code.

18. The data transceiver of claim 17, the data transceiver further comprising:
circuitry to transmit the 8B/10B code groups in a differential pair signal over the device-to-device interconnection; and
circuitry to set a data rate of the differential pair signal based, at least in part, on the selected data transmission rate.

19. The data transceiver of claim 12, wherein the at least one control message comprises a control message indicating a status of a data link in the transmission medium.

20. The data transceiver of claim 12, wherein the circuitry to transmit the 8B/10B code groups further comprises circuitry to transmit the 8B/10B code groups to the destination device in a plurality of differential pair signals.

21. A controller for communication using an 8B/10B code, the controller comprising:
a media access control device to receive an Ethernet data frame; and
circuitry to transmit 8B/10B code groups in a device-to-device interconnection to a destination device, the 8B/10B code groups including portions of the Ethernet data frames, and to insert at least one control message encoded as one or more 8B/10B code groups among the transmitted 8B/10B code groups, wherein the at least one control message is transmitted in-band by inserting the at least one control message between an end of packet delimiter code group and an idle code group sequence by the circuitry, and the control message specifies management data input/output (MDIO) register information, thereby allowing for at least one of access to MDIO registers at the destination device, capability to specify read and/or write access to a specific MDIO register at the destination device, and capability to specify information to be written to an MDIO register at the destination device.

22. The controller of claim 21, the controller further comprising circuitry to transmit the 8B/10B code groups in a first differential pair signal.

23. The controller of claim 22, the controller further comprising:
circuitry to receive 8B/10B code groups in a second differential pair signal containing Ethernet data frames from the destination device; and
circuitry to perform at least one of code group synchronization and bit synchronization of the second differential pair signal in response to the 8B/10B code groups received from the destination device.

24. The controller of claim 21, wherein the media access control device comprises circuitry to receive the Ethernet data frames from a host computer system.

25. The controller of claim 21, wherein the media access control device comprises circuitry to receive the Ethernet data frames from a switch fabric.

26. The controller of claim 21, the data transceiver further comprising:
circuitry to transmit the 8B/10B code groups in a differential pair signal over the device-to-device interconnection; and circuitry to set a data rate of the differential pair signal based, at least in part, on a selected data transmission rate.

27. The controller of claim 21, wherein the at least one control message comprises at least one of a control message indicating one of full duplex and half duplex modes for transmitting data in a transmission medium, and at least one K-character associated with the 8B/10B code.

28. The controller of claim 21, wherein the at least one control message comprises a control message indicating a change in power state of a computing platform, the change in power state being one of a change from full power to snooze, or from snooze to full power.

29. The controller of claim 21, wherein the circuitry to transmit the 8B/10B code groups further comprises circuitry to transmit the 8B/10B code groups to the destination device in a plurality of differential pair signals.

30. A method for communication using an 8B/10B code, the method comprising:
receiving 8B/10B code groups from a device-to-device interconnection, the received 8B/10B code groups including portions of Ethernet data frames;
detecting, by an inserting circuit, at least one control message encoded as one or more 8B/10B code groups among the received 8B/10B code groups, wherein the at least one control message is transmitted in-band by inserting the at least one control message between an end of packet delimiter code group and an idle code group sequence and the control message specifies management data input/output (MDIO) register information, thereby allowing for at least one of access to MDIO registers at a destination device, capability to specify read and/or write access to a specific MDIO register at the destination device, and capability to specify information to be written to an MDIO register at the destination device; and
decoding the at least one control message according to a predetermined 8B/10B code group mapping.

31. The method of claim 30, wherein receiving the 8B/10B code groups from the device-to-device interconnection comprises receiving the 8B/10B code groups from a differential pair signal.

32. The method of claim 31, wherein the method further comprises performing at least one of bit synchronization and code group synchronization on the differential pair signal in response to the received 8B/10B code groups.

33. The method of claim 30, wherein the at least one control message comprises a control message indicating at least one of a selected protocol for transmitting data in the transmission medium, and a selected data transmission rate for transmitting data in the transmission medium.

34. The method of claim 30, wherein the at least one control message comprises a control message indicating at least one K-character associated with the 8B/10B code.

35. The method of claim 30, wherein the at least one control message comprises a control message indicating one of fall duplex and half duplex modes for transmitting data in the transmission medium.

36. The method of claim 30, wherein the at least one control message comprises a control message indicating a change in power state of a computing platform, the change in power state being one of a change from full power to snooze, or from snooze to frill power.

37. The method of claim 30, wherein the at least one control message comprises a control message indicating a reset event.

38. The method of claim 30, the at least one control message comprises a control message indicating a status of a data link.

39. The method of claim 30, the method further comprising receiving the 8B/10B code groups from a plurality of differential pair signals.

40. A network controller for communication using an 8B/10B code, the network controller comprising:
a circuit to receive 8B/10B code groups from a device-to-device interconnection, the received 8B/10B code groups including Ethernet data frames;
a media access control device to transmit the Ethernet data frames to a destination; and
a physical coding sublayer circuit to detect at least one control message encoded as one or more 8B/10B code groups among the received 8B/10B code groups, and to decode the at least one control message according to a predetermined 8B/10B code group mapping; wherein the at least one control message is transmitted in-band by inserting the at least one control message between an end of packet delimiter code group and an idle code group sequence by the physical coding sublayer circuit and the control message specifies management data input/output (MDIO) register information, thereby allowing for at least one of access to MDIO registers at a destination device, capability to specify read and/or write access to a specific MDIO register at the destination device, and capability to specify information to be written to an MDIO register at the destination device.

41. The network controller of claim 40, wherein the at least one control message comprises a control message indicating a status of a data link.

42. The network controller of claim 40, wherein the at least one control message comprises a control message indicating at least one of a selected protocol for transmitting data in the transmission medium, and a selected data transmission rate for transmitting data in the transmission medium.

43. The network controller of claim 40, wherein the at least one control message comprises at least one K-character associated with the 8B/10B code.

44. A data transceiver for communication using an 8B/10B code, the data transceiver comprising:
a circuit to receive 8B/10B code groups from a device-to-device interconnection, the received 8B/10B code groups including Ethernet data frames;
a physical media dependent section to transmit the Ethernet data frames in a transmission medium; and
a circuit to detect at least one control message encoded as one or more 8B/10B code groups among the received 8B/10B code groups, and to decode the at least one control message according to a predetermined 8B/10B code group mapping; wherein the at least one control message is transmitted in-band by inserting the at least one control message between an end of packet delimiter code group and an idle code group sequence by the circuit to detect and the control message specifies management data input/output (MDIO) register information, thereby allowing for at least one of access to MDIO registers at a destination device, capability to specify read and/or write access to a specific MDIO register at the destination device, and capability to specify information to be written to an MDIO register at the destination device.

45. The data transceiver of claim 44, wherein the at least one control message comprises a control message indicating a change in power state of a computing platform, the change in power state being one of a change from full power to snooze, or from snooze to full power.

46. The data transceiver of claim 44, wherein the at least one control message comprises a control message indicating a reset event.

47. The data transceiver of claim 44, wherein the circuit to receive the 8B/10B code groups comprises circuitry to receive the 8B/10B code groups on a plurality of differential pair signals.

48. A system for communication using an 8B/10B code, the system comprising:
- a host processing system comprising a host processor and a system memory to host an operating system; and
- a network controller comprising:
  - a circuit to receive 8B/10B code groups, from a device-to-device interconnection, the received 8B/10B code groups including Ethernet data frames;
  - a media access control device to transmit the Ethernet data frames to the host processing system via a data bus; and
  - a physical coding sublayer circuit to detect at least one control message encoded as one or more 8B/10B code groups among the received 8B/10B code groups and to decode the at least one control message according to a predetermined 8B/10B code group mapping; wherein the at least one control message is transmitted in-band by inserting the at least one control message between an end of packet delimiter code group and an idle code group sequence by the physical coding sublayer circuit and the control message specifies management data input/output (MDIO) register information, thereby allowing for at least one of access to MDIO registers at a destination device, capability to specify read and/or write access to a specific MDIO register at the destination device, and capability to specify information to be written to an MDIO register at the destination device.

49. The system of claim 48, wherein the host processing system comprises a driver defining buffer locations for storing data from Ethernet data frames received from the media access control device.

50. The system of claim 48, wherein the system further comprises a peripheral component interconnect bus to couple the controller to the host processing system.

51. The system of claim 48, wherein the controller comprises a TCP/IP offload engine to process data packets in the received Ethernet data frames.

52. The system of claim 48, wherein the system further comprises a data transceiver, the data transceiver comprising:
- a physical media dependent section to receive the Ethernet data frames from a transmission medium; and
- a circuit to transmit the 8B/10B code groups to the network controller though the device to-device interconnection.

* * * * *